(12) United States Patent
Pech et al.

(10) Patent No.: US 7,458,534 B2
(45) Date of Patent: Dec. 2, 2008

(54) SEAT-BELT PRETENSIONER COUPLING

(75) Inventors: Michael Pech, Hamburg (DE); Stefan Höfs, Hamburg (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 10/580,087

(22) PCT Filed: Nov. 10, 2004

(86) PCT No.: PCT/EP2004/012679

§ 371 (c)(1),
(2), (4) Date: Mar. 26, 2007

(87) PCT Pub. No.: WO2005/049395

PCT Pub. Date: Jun. 2, 2005

(65) Prior Publication Data

US 2007/0221773 A1    Sep. 27, 2007

(30) Foreign Application Priority Data

Nov. 18, 2003  (DE) ................................ 103 53 770

(51) Int. Cl.
*B60R 22/46* (2006.01)

(52) U.S. Cl. ................ 242/374; 242/383.2; 242/379.1; 280/806; 297/480

(58) Field of Classification Search ................ 242/374, 242/379.1, 383.2, 390.6, 390.9; 297/480; 280/806; *B60R 22/46*
See application file for complete search history.

(56) References Cited

U.S. PATENT DOCUMENTS

| 5,794,877 | A  | * | 8/1998 | Ono et al. ................ 242/379.1 |
| 5,931,402 | A  | * | 8/1999 | Weller ..................... 242/383.2 |
| 6,513,747 | B1 | * | 2/2003 | Lee et al. ..................... 242/374 |
| 6,554,092 | B2 | * | 4/2003 | Midorikawa et al. ........ 180/268 |
| 2002/0017584 | A1 | * | 2/2002 | Specht ..................... 242/390.9 |

FOREIGN PATENT DOCUMENTS

| DE | 196 09 524 A1 | 9/1997 |
| EP | 1 382 497 A1 | 1/2004 |

* cited by examiner

*Primary Examiner*—Stefan Kruer
(74) *Attorney, Agent, or Firm*—Brinks Hofer Gilson & Lione

(57) ABSTRACT

A pretensioner coupling for a seat belt retractor for a motor vehicle of a type having a belt shaft and a pretensioner drive for winding the belt shaft. The pretensioner coupling having a coupling latch movably arranged between a release position and an engagement position. The coupling latch produces a load-transmitting rotational connection between the belt shaft and the pretensioner drive when in the engagement position and movable out of the engagement position and into the release position to permit relative rotation between the belt shaft and the pretensioner drive. An inertial mass mounted on the belt shaft is rotationally arranged in relation to the belt shaft and the coupling latch being coupled with the inertial mass wherein the inertial mass rotates more slowly than the belt shaft upon winding of the belt shaft by the pretensioner drive thereby moving the coupling latch to the engagement position, and wherein the inertial mass rotating faster than the belt shaft at the conclusion of the winding of the belt shaft by the pretensioner drive, moving the coupling latch to the release position.

9 Claims, 2 Drawing Sheets

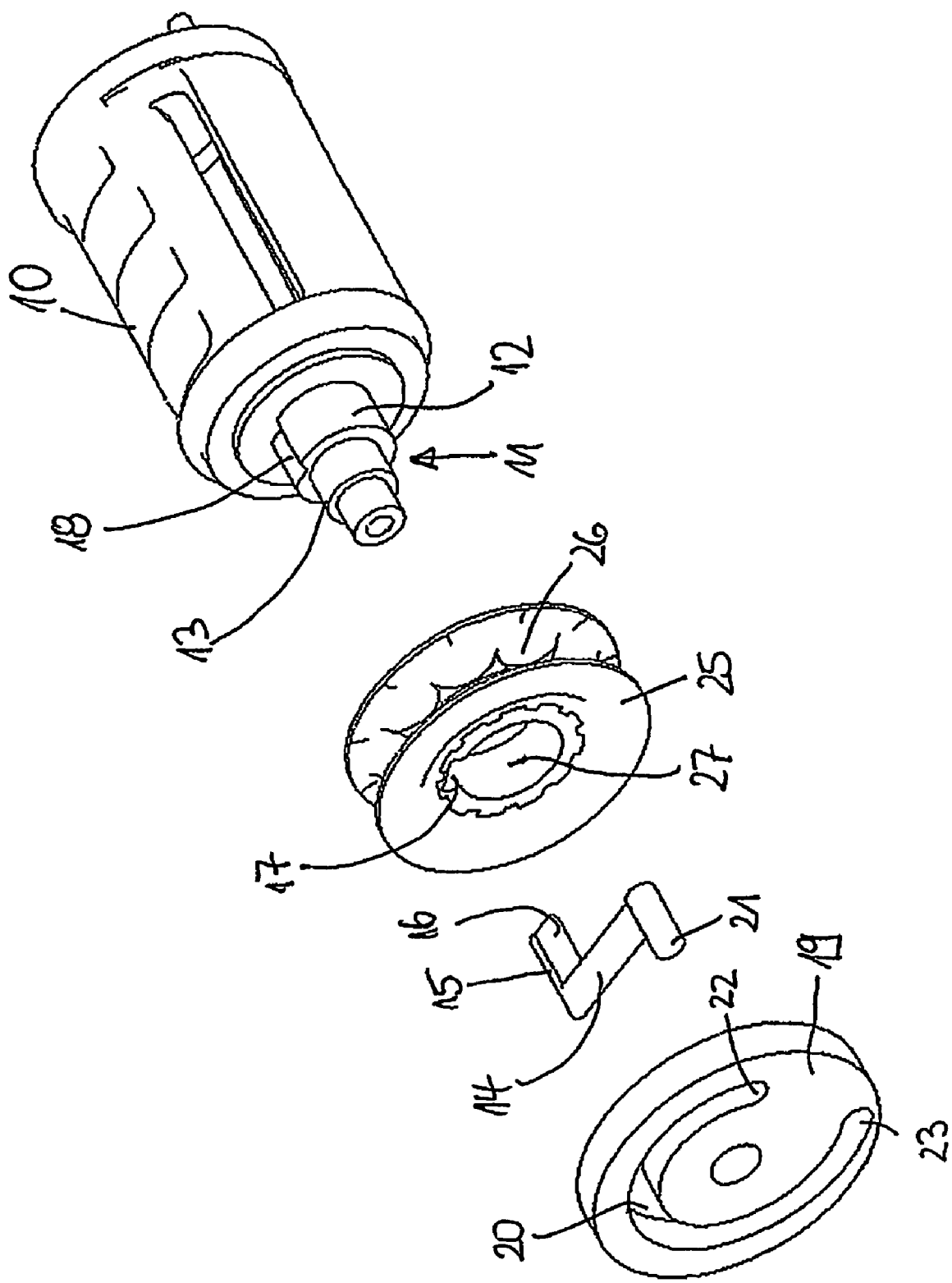
FIG..1

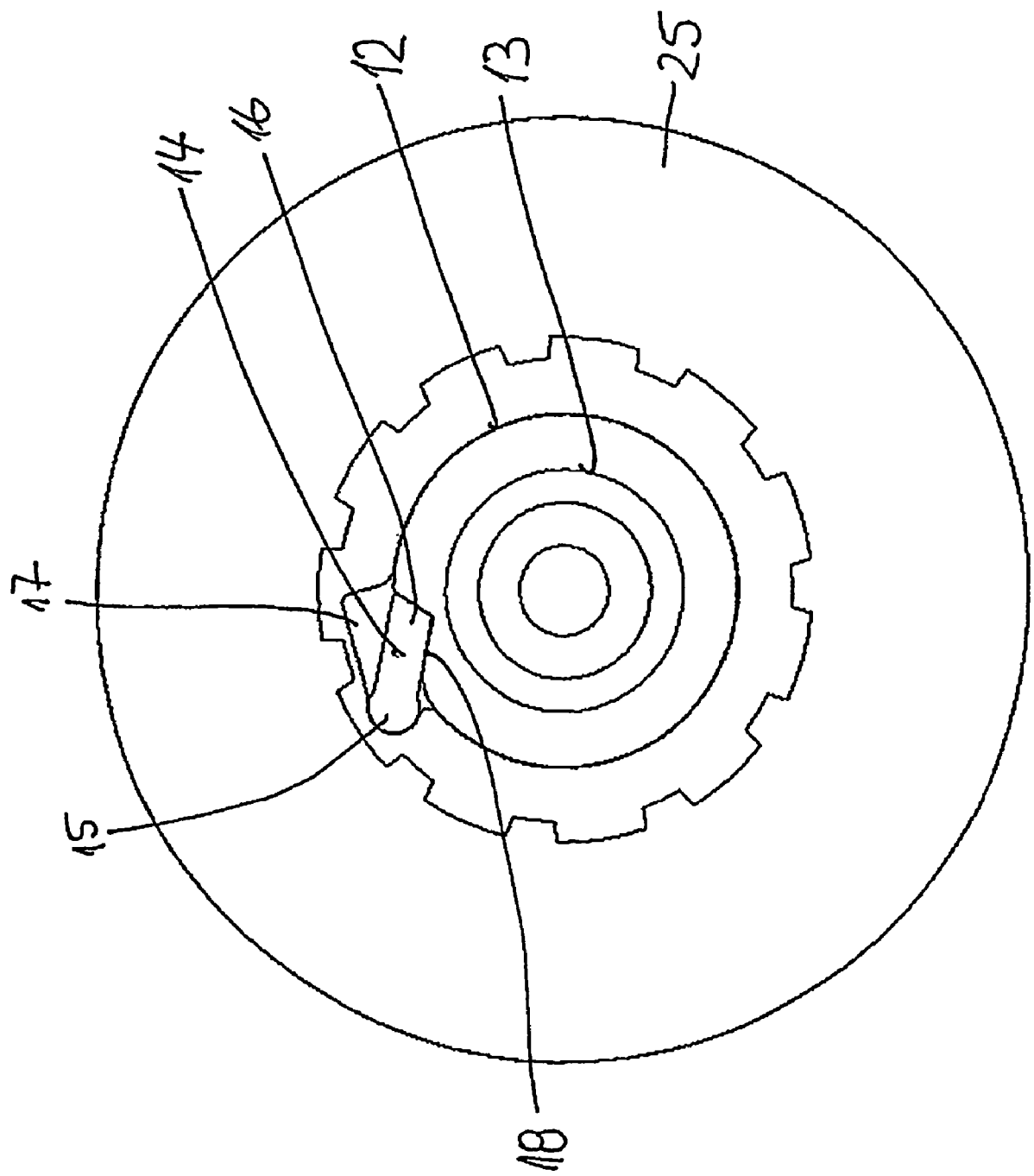
FIG..2

SEAT-BELT PRETENSIONER COUPLING

CROSS REFERENCE TO RELATED APPLICATIONS

This application claims priority to German patent application number 103 53 770.8, filed Nov. 18, 2003 and PCT/EP2004/012679, filed Nov. 10, 2004.

FIELD OF THE INVENTION

The invention relates to a motor vehicle seat belt retractor of a type having a pretensioner which can be coupled to a belt shaft thereof by means of a pretensioner coupling. The pretensioner coupling having a coupling latch movably arranged between a release position and an engagement position. The coupling latch producing a load-transmitting connection between the belt shaft and pretensioner drive when in its engagement position and moving out of the engagement position and into the release position at the conclusion of the coupling movement.

BACKGROUND OF THE INVENTION

A seat-belt retractor having the above features is described in EP 0 737 606 A1. If, in this type of seat-belt pretensioner, the drive connection between the pretensioner drive and belt shaft is established only by activating a coupling so that the belt shaft can rotate unobstructed in normal operation, then this condition of unobstructed rotatability of the belt shaft must also be again ensured after a coupling step has occurred so that, in the event that the seat-belt pretensioner has been equipped with a force-limiting device for example which allows controlled extraction of belt webbing, this device can operate unimpaired following the coupling step. In the known seat-belt pretensioner, a cage is detachably fastened to the housing to develop the forcibly controlled return of the coupling latch out of its load-transmitting engaged state into its release state, this cage being provided with both insertion surfaces and drive-out surfaces that respectively cooperate with trigger ramps and drive-out ramps configured on the coupling latches.

The known seat-belt pretensioner has the disadvantage that the design of the cage with different control surfaces on the one hand and the design of ramps of different fitting arrangements on the coupling latches on the other hand is complicated and costly to manufacture and assemble, so that the invention addresses the problem of simplifying the drive-out of the coupling latch after the coupling step has terminated in a seat-belt pretensioner having features of the type described above.

SUMMARY OF THE INVENTION

In the basic concept of the invention, an inertial mass is mounted on the belt shaft, this inertial mass being rotationally arranged in relation to the belt shaft and being rotationally displaced in the direction of winding when the belt drive is released from the belt shaft, and that the coupling latch is coupled to the inertial mass in such a manner that the inertial mass, which runs behind and has a greater rotational speed than the belt shaft at the end of the coupling step, drives the coupling latch out of its engagement position. The invention has the advantage that, as additional components for the return of the coupling latch at the termination of the coupling step, only the inertial mass must be provided, whereby a suitable actuating member for cooperating with the inertial mass must be provided on the coupling latch. This ensures a simpler construction of the pretensioner coupling, even from the viewpoint of an active return of the coupling latch after the end of the coupling step.

In one embodiment, the invention provides that the coupling latch, which is radially arranged to swing between the release position and the engagement position, engages a radial cam track arranged in the inertial mass using a pin on the arm located at an axial distance from the coupling latch engagement region. In addition to the additional cam track already mentioned, it is only necessary to provide the coupling latch. This will not significantly increase the cost of the seat belt retractor.

It can be provided that the radial cam track is arranged in the inertial mass with such a shape that, after the release of the pretensioner drive, the pin of the coupling latch being located in the radial cam track and the coupling latch having been driven out of its engagement position, takes along and accelerates the inertial mass in the direction of winding of the belt shaft, and that the pin migrates into the radial cam until reaching an end position when the rotational speed of the belt shaft slows down, thereby radially swinging the coupling latch from the engagement position into the release position.

DESCRIPTION OF THE DRAWINGS

The drawing depicts an exemplary embodiment of the invention, which is described below. The drawing shows:

FIG. 1 illustrates the coupling side of a seat-belt pretensioner with the belt shaft and belt drive pulled apart in the drawing, FIG. 2 shows the seat-belt pretensioner in an assembled state when the belt shaft and belt drive are engaged.

DETAILED DESCRIPTION OF THE INVENTION

A retractor having features of this invention includes a belt shaft 10 which has seat belt webbing (not shown) wrapped thereon. Belt shaft 10 rotates in a retractor frame (not shown) mounted to the associated vehicle. The belt shaft 10 visible in FIG. 1 has a shaft extension 11, which in turn forms a coupling neck 12 and a mounting extension 13 attached radially thereto.

A pretensioner drive having a drivewheel 25 is rotationally mounted on the coupling neck 12 of the shaft extension 11, whereby the drivewheel forms dome-shaped recesses, indicated by 26, for accommodating drive bodies (not illustrated), preferably mass spheres. A pretensioner which include drivewheel 25 which drives the belt shaft 10 rotationally is known from the prior art.

A coupling latch 14, which forms a mounting region 15 and an engagement region 16, is arranged between the central mounting recess 27, by which the drivewheel 25 is mounted on the coupling neck 12 of the belt shaft 10, and the coupling neck 12. A recess 17 for accommodating the coupling latch 14 is disposed on the inside wall of the drivewheel 25 that surrounds the mounting recess 27. Recess 17 is dimensioned in such a way that the coupling latch 14 lies in the non-engagement position in the recess 17 so that the coupling neck 12 of the belt shaft 10 can rotate freely in the mounting recess 27 of the drivewheel 25.

To produce the coupling connection between belt shaft 10 and drivewheel 25, the perimeter of the coupling neck 12 of the belt shaft 10 is provided with a notch 18 to accommodate the engagement region 16 of the coupling latch 14 so that when the coupling latch 14 swings out of its position in the recess 17, the coupling latch braces or locks itself between recess 17 and notch 18, thereby producing the rotational coupling connection.

An inertial mass 19 is rotationally mounted on the mounting extension 13 axially next to the drivewheel 25 and forms a radial cam track 20 which is engaged by a pin 21 of coupling latch 14 located at an axial distance from the mounting region 15 and engagement region 16. Radial cam track 20 forms a spiral shaped groove having a varying distance from the rotational axis of belt shaft 10. Cam track 20 forms end surfaces 22 and 23, with end 23 further from the rotational axis than end 22. In its rest position, the inertial mass 19 is arranged in such a manner that the pin 21 rests at the end 23 of the radial cam track 20 which positions the coupling latch 14 in the recess 17 and out of engagement with the notch 18.

If the drivewheel 25 rotates when the pretensioner device is activated to wind the seat belt in, then this motion relative to the inertial mass 19, which resists rotating due to its moment of inertia is still standing still, will result in an immediate swinging of the coupling latch 14 to its engagement position, engaging with the notch 18. This occurs since pin 21 is driven toward track end 22. The coupling connection produced in this manner converts the further rotation of the drivewheel 25 into rotation in the same direction as that of the belt shaft 10. If the rotational speed of belt shaft 10 and drivewheel 25 declines at the end of the coupling step, then the inertial mass 19 will continue to rotate with approximately constant speed because of its rotational inertia, so that the pin 21 of the coupling latch 14 relocates within the radial cam track 20 at the other end 23 of the radial cam track as the relative speed between belt shaft 10, drivewheel 25 and inertial mass 19 increases. This brings the coupling latch 14 actively out of engagement with the notch 18 of the coupling neck 12 and returns it back into position within the recess 17. In that position, drivewheel 25 can rotate relative to belt shaft 10.

The features of the subject matter of these documents disclosed in the present description, claims, abstract and drawing may be essential to the realization of the invention in its various embodiments both individually and in arbitrary combinations with each other.

The invention claimed is:

1. A pretensioner coupling for a seat belt retractor for a motor vehicle, the retractor having a belt shaft and a pretensioner drive adapted for rotating to wind the belt shaft, the pretensioner coupling comprising:
   a coupling latch movably arranged between a release position and an engagement position, the coupling latch producing a load-transmitting rotational connection between the belt shaft and the pretensioner drive when in the engagement position and movable out of the engagement position and into the release position to permit relative rotation between the belt shaft and the pretensioner drive, and
   an inertial mass mounted on the belt shaft and being rotationally arranged in relation to the belt shaft, the coupling latch being coupled with the inertial mass wherein the inertial mass rotates more slowly than the pretensioner drive when the pretensioner drive has been activated to wind the belt shaft thereby moving the coupling latch to the engagement position, and the inertial mass rotating faster than the belt shaft at the conclusion of the winding of the belt shaft by the pretensioner drive, moving the coupling latch to the release position, and wherein the coupling latch is arranged to swing between the release position and engagement position, the coupling latch having a pin which engages a radial cam track formed by the inertial mass.

2. The pretensioner coupling according to claim 1, wherein the radial cam is arranged in the inertial mass having a shape that, when the pretensioner drive is activated to wind the belt shaft, the pin of the coupling latch being located in the radial cam track moves the coupling latch into the engagement position, and the pin engages and accelerates the inertial mass in the direction of winding of the belt shaft by the pretensioner drive, and when the rotational speed of the belt shaft slows down, the pin moves in the cam track to move the coupling latch from the engagement position into the release position.

3. The pretensioner coupling according to claim 1 wherein the pretensioner drive includes a drive wheel journalled for rotation on a coupling neck of the belt shaft, the coupling neck forming a notch and the drivewheel forming a recess, the coupling latch engaging both the notch and the recess in the engagement position thereby rotationally coupling the drivewheel and the belt shaft, and in the release position, disengaging the connection between the notch and the recess, allowing relative rotation between the drivewheel and the belt shaft.

4. The pretensioner coupling according to claim 1 wherein the radial cam track is spiral in shape having first and second ends with the first end being located closer to the rotational axis of the belt shaft then the second end.

5. The pretensioner coupling according to claim 4 wherein the pin engages the first end to drive the inertial mass to rotate.

6. A pretensioner coupling for a seat belt retractor for a motor vehicle, the retractor having a belt shaft and a pretensioner drive for winding the belt shaft, the pretensioner coupling comprising:
   the belt shaft having a coupling neck forming a notch,
   the pretensioner drive having a drivewheel journalled for rotation on the coupling neck, the drivewheel forming a recess,
   a coupling latch having an engagement region and a pin positioned on opposite ends of an arm, the latch movable between a release position and an engagement position, the coupling latch engagement region engaging both the notch and the recess producing a load-transmitting rotational connection between the belt shaft and the drivewheel when in the engagement position, and movable out of the engagement position and into the release position wherein the engagement region disengages coupling between the recess and the notch to permit relative rotation between the belt shaft and the drivewheel, and
   an inertial mass mounted on the belt shaft and being rotationally arranged in relation to the belt shaft, the inertial mass forming a cam track in the form of a spiral, the pin positioned in the cam track wherein when the pretensioner drive is activated to drive the belt shaft, the drivewheel rotates relative to the inertial mass, moving the pin in the cam track and orienting the engagement region to the engaged position and the pin reaching an end of the cam track forcing the inertial mass to rotate with the belt shaft, and upon the pretensioner drive no longer driving the drivewheel, the inertial mass is rotating faster than the belt shaft causing the pin to move in the cam track to move the latch to the release position.

7. The pretensioner coupling according to claim 6 wherein the radial cam track is spiral in shape having first and second ends with the first end being located closer to the rotational axis of the belt shaft than the second end.

8. The pretensioner coupling according to claim 6 wherein the pin is driven to engage the first end upon driving by the pretensioner drive.

9. The pretensioner coupling according to claim 7 wherein the pin engages the first end to drive the inertial mass to rotate.

* * * * *

UNITED STATES PATENT AND TRADEMARK OFFICE
CERTIFICATE OF CORRECTION

PATENT NO. : 7,458,534 B2
APPLICATION NO. : 10/580087
DATED : December 2, 2008
INVENTOR(S) : Michael Pech et al.

It is certified that error appears in the above-identified patent and that said Letters Patent is hereby corrected as shown below:

On the Title Page

Item (75), after "Stefan Höfs," delete "Hamburg" and substitute --Eckenforde-- in its place.

In the Claims

In column 3, claim 2, line 68, immediately after "according to claim 1" delete ";".

Signed and Sealed this

Twenty-sixth Day of May, 2009

JOHN DOLL
*Acting Director of the United States Patent and Trademark Office*